(No Model.)
S. C. BALL.
COMBINED STRIKER OUT AND PLANT SPACER.
No. 457,928. Patented Aug. 18, 1891.
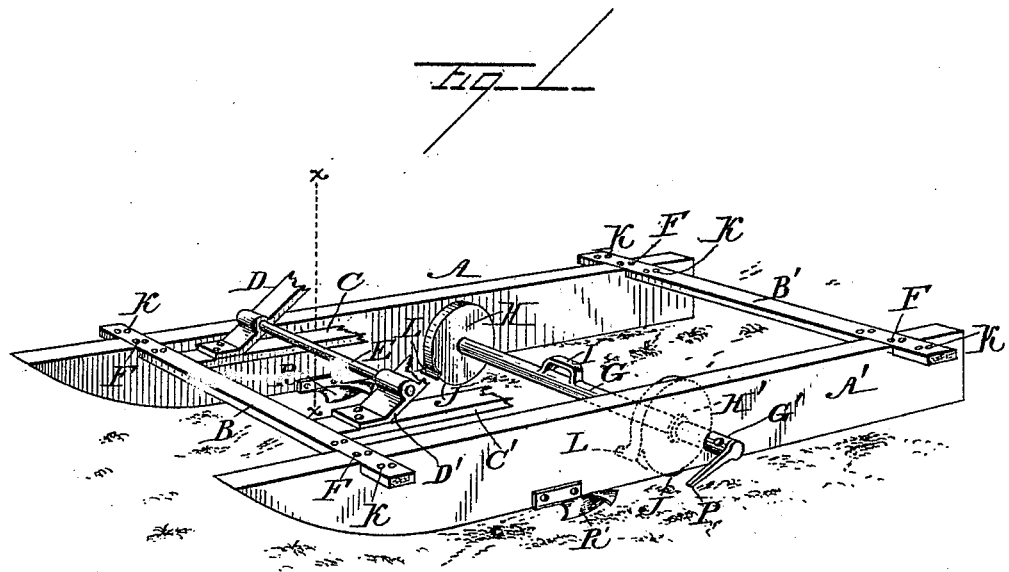
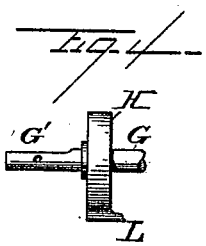
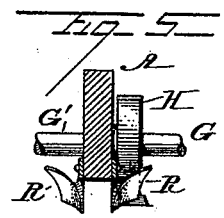
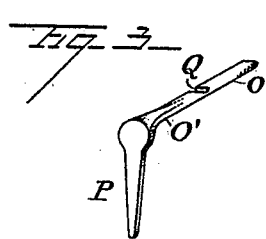
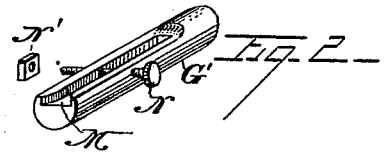
WITNESSES:
John R. Nolan
Joshua Pusey
INVENTOR
Samuel C. Ball
BY George E. Buckley
ATTORNEY.

UNITED STATES PATENT OFFICE.

SAMUEL C. BALL, OF HOLICONG, PENNSYLVANIA, ASSIGNOR, BY MESNE ASSIGNMENTS, TO ANNA R. BALL, OF SAME PLACE.

COMBINED STRIKER-OUT AND PLANT-SPACER.

SPECIFICATION forming part of Letters Patent No. 457,928, dated August 18, 1891.

Application filed July 5, 1890. Serial No. 357,893. (No model.)

*To all whom it may concern:*

Be it known that I, SAMUEL C. BALL, a citizen of the United States, and a resident of Holicong, Bucks county, State of Pennsylvania, have invented a new Combined Striker-Out and Plant-Spacer, of which the following is a description, reference being had to the annexed drawings, making part hereof.

The nature of my invention will fully appear from the following description and claims; and it has for its object not only the striking out simultaneously, by means of a sled of the usual form of runners, of two lines upon which corn, grain, or other plant is to be set, but also the spacing of the distances apart at which the various deposits of seed or plants are to be placed, the striking out of the two lines and of the spacing of the distances being accomplished by traverses of the field or plot of ground in parallel lines, obviating the necessity of striking out transverse lines to space the intervals between points of planting.

In the drawings, Figure 1 is a perspective view of so much of my apparatus as is necessary to illustrate the invention; Fig. 2, a similar view of one end of the axle carrying the spacing or marking wheels, such end being provided with a flaring groove, a hole, and bolt and nut; Fig. 3, a similar view of a lug adapted to be set and secured in said end, the lug being provided at its outer end with an angular marker-bar set upon it and adapted to strike the ground at every revolution of the axle; Fig. 4, a detached front elevation of one wheel, showing the inside prolongation of the marker; Fig. 5, a vertical cross-sectional view of one runner, showing the shoe (in this case located at each side of the runner) followed by a wheel.

Referring by letter to said drawings, A A' are the sled-runners; B B', cross-bars of the frame; C C', longitudinal pieces between the runners to support seat-standards D D', and provided with a bar E, to which a pole or shafts may be attached.

K K are holes in cross-bars B B', adapted to receive screws F, to secure these bars to the sled-runners. The said bars are so pierced with these holes as to permit the runners to be set at various distances apart.

F F are screws to secure the cross-bars to the runners; G, an axle, preferably cast in one piece with wheels H H', and with loop or handle I. This axle projects through the runners, (on each side,) as shown on one side at G'. Each wheel H and H' is cast with a gradually-swelling part J on one edge or tread, which part swells to a projecting point or marker L, which extends laterally inward from said wheel. These markers L correspond in position on each wheel, so as to strike the ground simultaneously.

M is a groove in the axle G, which flares outwardly, as shown; N, a screw-bolt passing through a plain hole in end G' of the axle and provided with nut N'; O, a lug adapted by its swell O' to conform to the flared groove M and to fit snugly therein; P, a marker, consisting of a plain bar, at right angles (in the case shown) to lug O and cast in one piece thereon; Q, an indentation cast in the surface of lug O.

When the lug O is set snugly in groove M, the bolt N is inserted through G' of the axle and sets across lug O in depression Q, and is tightened up in place by the nut N'. The groove M and lug O are preferably polygonal in cross-section, so that the lug will revolve with the axle. This form of construction takes the strain off bolt N in turning. If the groove and lug were round, the wear would be on the bolt. The handle I is cast in such a position on axle G as to be uppermost when markers L L are in the ground—that is, on the side of the axle opposite to the markers on the wheels, whereby the attendant can tell by the position of the handle when said markers are directly beneath the wheels. Marker P is so located as to strike the ground simultaneously with the markers L L of the wheels.

If it is desired at any time to substitute a longer axle for one in use, one on which wheels H H' are farther apart, one of the runners A or A' is removed, the old axle slipped out and the other one substituted, and the runner when replaced is set beneath an outer set of holes K and there secured, and vice versa, if a shorter axle is to be substituted.

R R' are shoes to enter and throw aside a furrow forward of and in the track of the wheels H H'. They are set beneath the machine attached to the runners, and are placed so far inside as to directly precede the wheels, each throwing up a small furrow, the wheels H H' following the line of the furrow which is inside of its neighboring runner.

The marker P outside of each runner is in practice located close enough to the runner to mark in the outer furrow made by shoes R.

The shoes R R' are located on the runners forward of the axle G, and the earth thrown aside by them may be returned into the furrows to cover up the corn or grain planted.

In operation the sled is drawn by a pair of horses over the plowed and harrowed field, the driver riding on the sled, which, in the practice well known for years, is provided with a seat for that purpose. Another old and well-known device (and for that reason not shown) is a laterally-projecting pole hinged near the driver, so as to be thrown from one side to another, and provided on its outer end with a drag, which will make an impression or line upon the earth to one side of the machine to act as an indicator, by which the driver can guide his horses in marking the next return trip. As the sled traverses the field upon one side thereof the runners make two marks on the earth, and small furrows are thrown up by shoes R R'. The wheels are of such diameter that one full revolution will cover the distance apart at which the grains are to be planted. At each full revolution the markers L L will strike the earth and make a clear indentation therein. When the sled reaches the end of one traverse of the field, the driver stops when the handle I is uppermost, the latter thus serving as an indicator, alights from and lifts his sled, then turns his horses so that the pole between them points along the line indicated or made by the drag, and sets down the sled with markers L L in the earth on a line opposite to the points made by them when he stopped. Meantime he throws his pole with its drag on the outside, or toward the unmarked portion of the field, again mounts his seat, and drives along the said indicated line, which is so far from his last line of traverse as to form new furrows in lines parallel with those last made and with spaces of equal width between the lines of furrows. This operation is continued until the field has been cut into lines of parallel furrows. This completes the operation of the sled.

The lines of corn planted will be parallel in one direction provided the lines of furrows made by the sled have been followed, and they will be parallel in the other because the spaces on the sled-runner lines have been equidistantly marked by the markers L L.

It is obvious that the markers P and the marking-wheels H H' might be employed either in conjunction or alternately, the markers P, by reason of their situation at the ends of the axle, being adapted to mark rows a greater distance apart than the wheels H H'.

It is evident that an axle G upon which wheels H H' are rigidly secured is an essential, in order that simultaneous action of the markers should be secured to, insure their striking the ground coincidently.

What I claim as new is—

1. In a land-marker, the combination, with two connected sled-runners, of a transverse shaft journaled in said runners and having its ends extending laterally therefrom and adapted to receive auxiliary markers, and wheels fixed on said shaft between the sled-runners and provided upon their peripheries with markers L, substantially as and for the purpose described.

2. A striker-out and plant-spacer composed of a sled having runners A A', and wheels H H', set on an axle G and turning therewith, the outer ends of said axle projecting through the runners and being provided with markers P P outside of the runners, all combined and operating substantially as described.

3. A striker-out and plant-spacer composed of a sled having runners A A', and wheels H H', set on an axle G and turning therewith, the outer ends of said axle projecting through the runners and being provided with markers P P detachably secured thereto and outside of said runners, all combined and operating substantially as described.

4. A striker-out and plant-spacer composed of a sled having runners A A', and wheels H H', set on an axle G turning therewith, the outer ends of said axle projecting through the runners and being provided with markers P P, outside of the runners, and shoes R R', attached to said sled forward of said markers, all combined and operating substantially as described.

In witness that the above is my invention I have hereunto set my hand.

SAMUEL C. BALL.

Witnesses:
  H. O. BUCKLEY,
  GEORGE E. BUCKLEY.